AUTOMATIC GAIN CONTROL SYSTEM

Filed Oct. 17, 1962 4 Sheets-Sheet 1

INVENTORS
ABRAHAM BROTHMAN
STEPHEN J. HALPERN
STEPHEN F. FINKEY
BY
OSTROLENK, FABER, GERB & SOFFEN
ATTORNEYS

AUTOMATIC GAIN CONTROL SYSTEM

Filed Oct. 17, 1962

INVENTORS
ABRAHAM BROTHMAN
STEPHEN J. HALPERN
STEPHEN F. FINKEY
BY
OSTROLENK, FABER, GERB & SOFFEN
ATTORNEYS

March 15, 1966 A. BROTHMAN ETAL 3,241,070

AUTOMATIC GAIN CONTROL SYSTEM

Filed Oct. 17, 1962 4 Sheets-Sheet 3

INVENTORS
ABRAHAM BROTHMAN
STEPHEN J. HALPERN
STEPHEN F. FINKEY

BY

OSTROLENK, FABER, GERB & SOFFEN
ATTORNEYS

INVENTORS
ABRAHAM BROTHMAN
STEPHEN J. HALPERN
BY STEPHEN F. FINKEY

OSTROLENK, FABER, GERB & SOFFEN
ATTORNEYS

United States Patent Office 3,241,070
Patented Mar. 15, 1966

3,241,070
AUTOMATIC GAIN CONTROL SYSTEM

Abraham Brothman, Dumont, N.J., Stephen J. Halpern, New York, N.Y., and Stephen F. Finkey, Passaic, N.J., assignors to Transitel International Corporation, Paramus, N.J., a corporation of New Jersey Filed Oct. 17, 1962, Ser. No. 231,078
10 Claims. (Cl. 325—411)

This invention relates to self-adjusting electronic circuitry and more particularly to a self-adjusting electronic circuit for use in communications systems for automatically adjusting the level of a received signal relative to a predetermined standard.

In communications systems, whether they be employed for transmission of coded information, video information, or audio information, the level of signal injection into the communications link, such as, for example, a telephone link, is limited to a maximum level. This restriction is necessary to prevent excessive cross-talk between adjacent lines. If several channels are derived from a single voice band width link, then each information channel can be allotted only a fraction of the total power. For communications equipment operating over a power line carrier, higher input levels are permissible, although an eventual limiting value still exists due to the possibility of radio interference. Signals carried over any communications media are, of course, subject to attenuation, which is a function of many variables. The attenuation of a typical telephone voice link has been measured at −15 and db at 1000 c.p.s. Considerable variation results as a function of the length of the link, the amount of switching, and the number and location of relay amplifiers along the route. A fixed route will be relatively constant in its attenuation and other properties, nevertheless, considerable seasonal, and even day to day variation will be encountered due to wet or icy exposed lines. Attenuations of 30 db are not uncommon in the frequency range of 2600 and 3000 c.p.s. Additional fluctuation may result from microwave fading if a portion of the link is connected over this media. If the communication link consists of a route through the switching network, considerable variation must be expected. Attenuation is variable with the quoted figure being applicable in the midrange of 1000–1500 c.p.s. Attenuation is increased due to the limited bandpass of the telephone link at higher and lower frequencies. Another attenuation factor encountered may be due to the random filtering effects of the link itself or of any amplifiers attached thereto.

Noise in the link may be caused from cross-talk between adjacent loops, coupling with nearby power lines, the inherent noise of electronic equipment, reflections of the input signal, dust, charged particles impinging upon open wire links and auroral noise when operating over microwave or high frequency radio channels. On long communication links, particularly if routed through telephone central offices, repeaters and amplifiers are used to maintain adequate signal strength. Each such amplifier introduces distortion and amplifies different frequencies unequally. Though such effects will remain reasonably constant over a single path, variations can be expected if different routes are employed on different occasions.

The noise present in transmitted signals is due to a variety of causes, some of which are:

*Fading.*—Lowering or diminishing of the signal to noise ratio during transmission of information signals which diminishing or lowering of the signal to noise ratio occurs over substantially long periods of time. Although the change in the transmitted signal takes place rather gradually it is still important to compensate or correct for this alteration in information signals in order to prevent misinterpretation of intelligence being transmitted.

*Dropout.*—Is that phenomenon which occurs during data, or intelligence transmission and which takes the form of a momentary rapid drop in signal level for a duration of time T where T is greater than 0.01 ms., and is equal to, or less than a duration of 20 ms. Although such momentary and abrupt changes have extremely small time durations, it should be realized that the information transmitted during these small time durations is very seriously altered and the value of this information may therefore be totally destroyed.

*Impulse noise.*—Is that phenomenon which takes the form of a momentary rapid rise [i.e., a pulse] in the signal level for a time duration T, where T is equal to or less than 0.001 ms., and equal to or greater than 20 ms., as in the case of drop out; similar effect upon intelligence being transmitted during the time duration T.

*Burst noise.*—Is that type of noise which effects intelligence transmission in the form of either a rise or a drop in signal level which signal level change takes place of a time duration T, where T is in the order of seconds.

*White noise.*—Is that form of noise signal present in intelligence transmission which is known as statistical noise, due to its random nature. This type of noise signal is most prevalent in information transmission and is most difficult to deal with due to the fact that it has an occurrence pattern which is completely random and in addition thereto, takes up the entire frequency spectrum and for that reason cannot be easily predicted as to its time of occurrence and overall effect.

Each of the above noise phenomenons in intelligence transmission contributes to the difficulty of successful information transmission and reception, causing a loss of a substantial percentage of the information and intelligence being transmitted, thereby seriously effecting the value of the entire message. Since the injection level of information signals has a maximum limit in order to avoid phenomenon such as cross-talk, for example, it can be seen that the signal-to-noise ratio may not be increased beyond a predetermined physical limit. It therefore becomes necessary to provide means for coping with such noise phenomenon in order to preserve the quality and validity of intelligence being transmitted so as to best minimize the loss of data being transmitted while at the same time providing the most economical transmission and reception systems and methods.

One method quite frequently used in prior-art systems is a redundancy method which provides for a complete repetition of the transmitted intelligence so that a comparison between the first and second transmission cycles may be made at the receiving facility in order to determine the validity of the received intelligence. This system has disadvantages in that due to the randomness of most of the noise phenomenon adequate comparison may not be possible since different portions of the message may have been seriously affected in the first and second transmissions. Also, if the same portion of the messages has been affected in both first and second transmission cycles, then that information which was transmitted during the portions of the transmission cycle which were most seriously affected by noise phenomenon are completely lost. Also, another disadvantage resides in the fact that twice as much transmission time is required and the equipment employed for transmission and reception must therefore be operated over a period which is double that of a single transmission cycle.

Another noise correction means presently in use is that of providing three transmission cycles comparing the receipt of all three information signal trains, and choosing, if there is any disagreement among the received signals, the signal which occurs in two out of the three received intelligence signal trains. Since most noise phenomenon have the characteristics of randomness with respect to occurrence, this system has a high probability that the correct message will be chosen, but this system has the decided disadvantage that three transmission cycles are required, thereby making it an extremely costly system from the aspect of both time and equipment.

Still another method used in prior-art communications systems is that of standardizing data to be transmitted by selecting discrete voltage levels for representing information to be transmitted so that these signals may be easily distinguished from one another at the receiving end of the communications system. One example is the binary system in which a first discrete voltage level is employed for representing a binary zero, and a second voltage level is employed for representing a binary one level condition. The binary zeros and binary ones are then transmitted in various combinations which have been coded in a predetermined manner to represent intelligence such as alphanumeric characters. One form that the binary signals may take is that of no signal, or zero voltage for representing a binary zero and a positive voltage level representing a binary one condition. A second example finding widespread use is the selection of a negative voltage level representing binary zero and a positive voltage level of the same magnitude as the negative voltage level, representative of a binary one condition.

Assuming that such a system is adopted, it then becomes necessary at the receiving end of a communications system to have the ability to discern between binary one and binary zero level signals in order to validly interpret the intelligence which has been transmitted in this coded form. Systems of this type, employing binary coded arrangements may likewise be affected by noise phenomenon whereas the noise signal may be additive to a binary one, for example, thereby making the total voltage level of a binary zero condition very nearly equal to the voltage level of a binary one condition. A second example is a momentary drop during a transmission of a binary one voltage level, thereby lowering this voltage level to a level which is nearly that of a binary zero signal. These coded bits being received by the communications receiver facility may then be misinterpreted due to the significant effect of noise phenomenon upon the coded binary decimal.

In order to avoid misinterpretation of the incoming binary data by the receiver facility, a variety of checking methods have been employed in prior-art communications systems. One such method is the transmission of the binary coded information followed by a second complete transmission of the same information. The information first received is then compared bit by bit against the information which is being transmitted for the second time in order to determine absolute coincidence therebetween. If the bits do not agree in this bit by bit check, it can therefore be assumed that some error has occurred in the data transmission. Although this method provides means for indicating the presence of errors in transmission of the data which may be the result of noise phenomenon which has effected the binary information, this is nevertheless a costly method in that it requires twice the normal transmission time and likewise requires operation of the transmission and receiving facilities over this double time period, thereby doubling the consumed power for the single message being transmitted. This method has further faults in communications applications which do not employ a self-checking code in that it cannot be positively ascertained as to which of the two transmissions contains the valid binary bits which were to have been transmitted, thus the use of such a method in a communications facility which is besieged with a substantial amount of noise phenomenon, the validity of the received binary information is highly doubtful.

In order to overcome some of the faults of the aforementioned method, a second method employed in present day communication systems is the transmission of the binary coded information three separate times, wherein upon receipt of all three transmissions of the binary information at the receiver facility, the binary bits of each transmission cycle are compared with the binary bits of the other two transmission cycles, such that the bits assumed to be valid are those which occur in the majority of the transmission cycles. For example, this means that if the first binary bit transmitted was received as a binary one in the first and third transmission cycles, and is received as a binary zero in the second transmission cycle, since the binary one occurred in the majority of the transmission cycles; namely, two out of three cycles, it is highly probable that the valid binary bit is the binary one, as opposed to the binary zero. This method thereby provides fewer invalid binary characters than the method previously described but increases the operating time necessary for transmission 50% over that of the previous method, and 300% over transmission of the binary information for only one transmission cycle. It can therefore be seen that this method is highly costly from the viewpoint of both time and power consumed for the total transmission cycle as well as requiring additional equipment at both ends of the communications system in order to perform the checking operations.

Still another method employed in present day communication systems consists of comparing each binary bit received by the receiver facility against a predetermined threshold voltage level which is selected so as to be a voltage level which is substantially intermediately binary one and binary zero voltage levels, and which is employed in such a manner that any voltage level received which is greater than the threshold value shall be interpreted as a binary one, while any received voltage level which is smaller in magnitude than the threshold value be interpreted as a binary zero. This method greatly reduces the number of invalid binary bits present in a message by providing an indication of the total number of such invalid bits which may be received, thereby making it easier to determine the necessity for retransmission of the information if the received information has a substantial number of invalid bits which thereby destroy the value of the received coded information.

One arrangement employed in communication systems is that of generating a carrier frequency signal of a predetermined frequency value which is amplitude modulated, such that a first level of amplitude modulation represents a binary zero condition and a second lower level of amplitude modulation represents a binary one condition. The receiver facility then is adapted to demodulate the modulated carrier frequency, and subsequently compare the modulating signal against the threshold level in a threshold gating means in order to determine the binary characteristic of each binary bit being received. Since the carrier frequency during the transmission portion of the cycle is exposed to noise phenomenon the amplitude thereof may be substantially effected so as to provide a non-constant amplitude for binary one bits, and similarly a non-constant amplitude for binary zero bits. Secondarily, the modulated carrier frequency undergoes a substantial amount of linear attenuation when traveling through the communication medium such that the modulated carrier frequency signal at the receiver facility is substantially less than that transmitted at the remote transmission location. Since the modulated carrier frequency signal has its binary one level amplitude severely attenuated during the transmission thereof, the incoming signal may not be directly compared against the threshold voltage value in order to determine the binary identity of the coded bits being transmitted. This has a substantial effect upon the binary identifying, or threshold gate, thereby severely complicating the interpretation of the received binary bits.

The device of the instant invention overcomes these significant problems by providing an arrangement for receiving the carrier frequency and adjusting the amplitude level of the incoming signal frequency to a value which forms a constant linear ratio with the threshold voltage level. This adjustment operation automatically corrects for attenuation which may result due to changing climatic conditions thereby completely avoiding the necessity for transmission of a test signal in order to calibrate the operating levels of the equipment prior to initiation of the transmission signal.

The device in the instant invention is comprised of an electronic circuit means for adjusting the voltage level of the incoming carrier frequency signal, due to a drift in the voltage level of the carrier frequency signal during the transmission thereof. The operating speed of the circuit is determined by the transmission bit rate, bit length of each information bit and the transmission mode, namely, amplitude; phase or frequency modulated carrier so as to correct the level of the incoming signals by the electronic adjusting circuitry in order to maintain a constant ratio between amplitude level of the carrier modulated signal and the predetermined selected threshold value, described previously.

The circuitry of the instant invention is comprised of electronic means for receiving the modulated carrier frequency and amplifying the substantially attenuated carrier frequency signal to a suitable voltage level. The modulated carrier is then fed into a demodulation circuit, having a fixed bias level from which the demodulation circuit output deviates, depending upon the signal level of the received modulated carrier. The response time of the demodulation circuitry is controlled by the bit rate and the mode of transmission and its reaction time is in the neighborhood of one character length. Simultaneously with receipt of the modulated carrier, the signal is transferred to a controlled gain amplifier which amplifies the received carrier signal to a signal level such that a predetermined ratio between the received signal and a threshold, or standard voltage level value is maintained. The demodulated carrier signal is then transferred from the demodulator circuit to a control terminal of the voltage gain amplifier and the level of this signal is employed to determine the amount of gain which the modulated carrier will undergo. The amplified carrier signal is then impressed upon a tone channel in the receiver facility which demodulates the modulated carrier frequency signal which has undergone amplification and compares this demodulated frequency signal against a threshold voltage level in order to identify the binary characteristic of the received coded information.

The controlled gain amplifier is provided with a three terminal linear resistance means which is employed in the amplifier circuit to accurately regulate the amount of gain introduced into the incoming carrier frequency signals by the controlled voltage gain amplifier.

Since only all electronic elements are employed in the self-adaptive terminal circuit (to be set forth more fully herein), the circuit provides high speed operation for maintaining a constant ratio between incoming signal and a threshold voltage level. The system designed is capable of receiving signals which due to attenuation may be down anywhere in the range of 30 db from the transmitted signal, thus providing an extremely wide operating range for the receiving facility. Greater operating ranges are possible depending only upon the needs of the user.

It is therefore one object of this invention to provide an all electronic circuit for maintaining an incoming signal at a constant amplitude due to attenuation undergone by the received signal.

Another object of this invention is to provide a self-adaptive terminal circuit for automatically maintaining a predetermined amplitude level for incoming signals, and having means for regulating the amplitude of the incoming signal, regardless of the fact that the incoming signal may undergo a substantially wide variety of changes in voltage amplitude.

Another object of this invention is to provide a self-adaptive terminal circuit having novel means for maintaining a constant ratio between the amplitude of an incoming signal and a threshold signal which may be of any predetermined value.

Another object of this invention is to provide a self-adaptive terminal circuit for maintaining a constant ratio between the amplitude of an incoming signal relative to a predetermined threshold value wherein a linear impedance means is provided for regulation of the amplification undergone by the incoming signal frequencies.

These and other objects of the invention will become apparent when reading the accompanying description and drawings in which.

Figure 1:
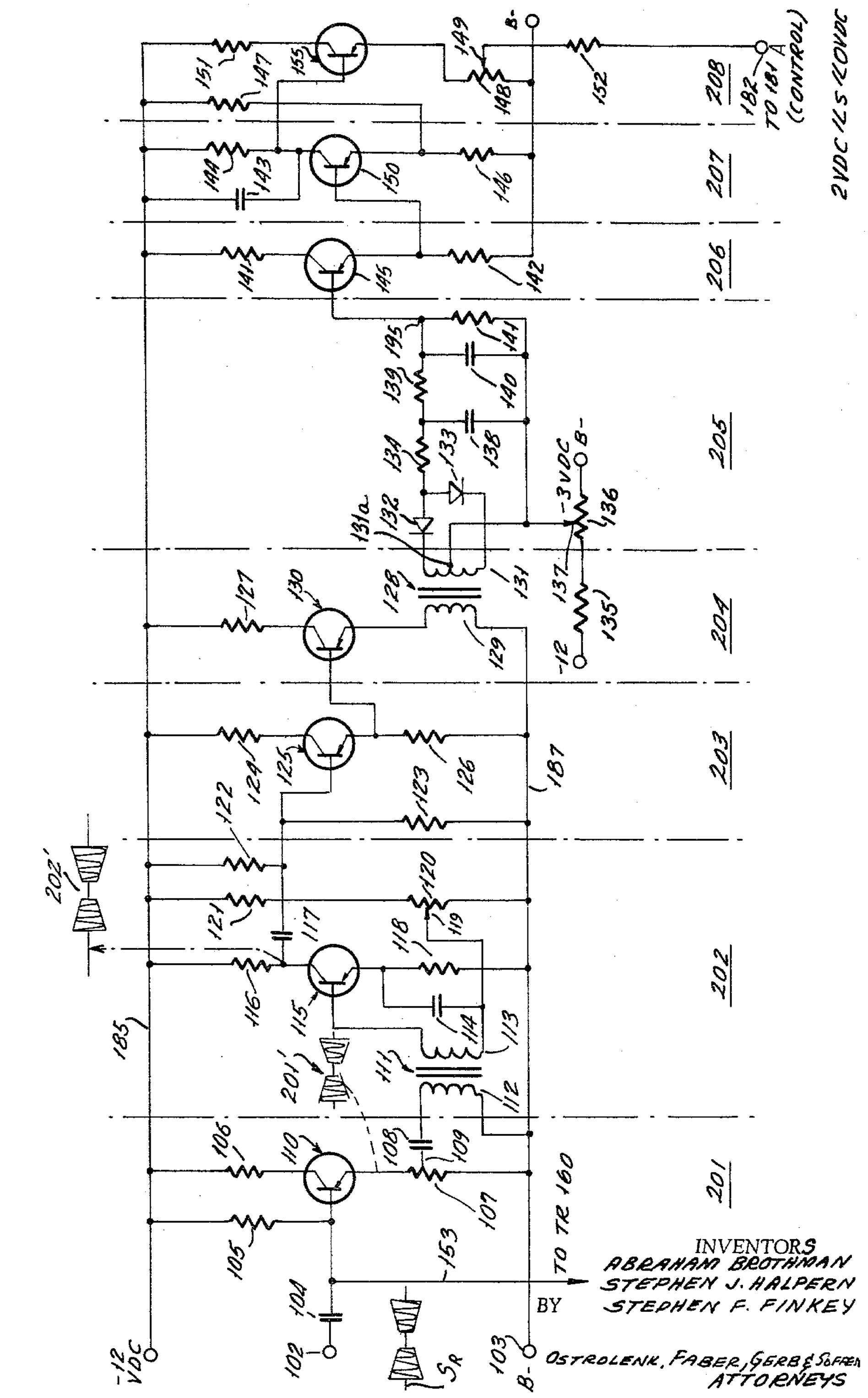
FIGURE 1 is a schematic of the self-adaptive terminal circuitry employing the principles of the instant invention.

Referring now to the drawings:

FIGURE 1 shows the self-adaptive terminal 100 having input terminal 102 and 103 for receiving a modulated carrier frequency signal S. Lower terminal 103 is connected to a reference level B− which designation is employed hereandafter to represent ground or reference potential. An adjustable terminal is provided along potentiometer resistance 107 for selecting the output level of the circuit 201.

The output of the emitter follower circuit 201 is impressed upon a voltage gain amplifier 202 having a transformer 111 whose primary winding 112 is connected between B− and adjustable terminal 109 which is in series with a capacitor 108. The secondary winding 113 has a first terminal connected to the base electrode of transistor 115, and its opposite terminal connected to the emitter electrode of transistor 115 by means of a capacitor 114. Transformer 111 together with emitter follower stage 201 provides the necessary impedance matching and coupling between input signal and gain amplifier 202, with the minimum amount of distortion. Resistances 116, 121, 118 and 120 provided in the circuit determine the operating limits of transistor 115. The signal developed by the gain amplifier stage 202 is impressed at the intersecting terminal between voltage divided resistances 122 and 123, and is impressed upon the base electrode of transistor 125. The signal is taken from the collector electrode of transistor 115 and is passed through capacitor 117 to the base electrode of transistor 125. Capacitor 117 provides A.C. coupling between the amplifier stage 202 and the emitter follower stage 203. The gain of gain stage 202 is adjusted to be about 100, as will be more fully described.

The transistor 125 comprises the basic element of the emitter follower stage 203 employed for coupling the signal of a suitable level generated by the gain stage 202 and impressing this signal upon a second emitter follower stage 204. Suitable control determining resistors 124 and 126 are further provided in emitter follower stage 203 for controlling the operating limits of the emitter follower stage. The output of emitter follower stage 203 is taken from the emitter electrode thereof and impressed upon the base electrode of transistor 130, comprising the emitter follower stage 204. The emitter follower stage 204 is a current amplifier having substantial current amplification characteristics. The emitter follower transistor 130 has its collector electrode connected to a suitable negative voltage level (for example, −12 volts D.C.) by means of source bus 185 through resistor 127. The emitter electrode of transistor 130 is connected to the B— level by means of reference potential bus 187, through the primary winding 129 of transformer 128. The secondary winding 131 of transformer 128 has its end terminals connected to the cathodes respectively of the semi-conductor members 132 and 133, respectively, which in turn have their anode electrodes connected in common to one terminal of resistor means 134. A center tap connection **131*a* is provided on the secondary winding 131 in order to connect a D.C. bias to the center tap 131*a*. The D.C. bias is provided by a bias control circuit comprising a first fixed resistance 135, having one of its terminals connected to a —12 volt reference, and its opposite terminal connected to a variable resistance 136. The remaining terminal of resistance 136 is connected to the B— level. A movable contact 137 is provided forming a potentiometer with resistance 136 in order to control the D.C. voltage level at center tap terminal 131*a*, wherein resistances 135 and 136** act as a voltage divider circuit between the —12 volt level and the B— level.

Semi-conductors 131 and 133 provide full wave rectification of input signals developed across the secondary winding 131 in a manner to be more fully described. The full wave rectified signals are passed through resistor 134 into a pi-filter network comprised of capacitors 138 and 140 picking up the parallel of the pi-circuit with the resistance 139 therein between providing the series leg of the pi-network. A resistor 141 is connected in parallel with capacitor 140 and has its upper terminal connected to the base electrode of transistor 145. The pi-network provides filtering of the full wave rectified signal produced by the semi-conductors 132 and 133 which generated D.C. bias is employed for the purpose of controlling the conduction of transistor 145, as will be more fully described.

Resistors 142 and 141 in the emitter and collector circuits respectively of transistor 145 are provided to control the operating characteristics of transistor 145. The signal for voltage level generated by transistor 145 is fed from its emitter electrode to the base electrode of transistor 150 which has parallel connected resistor capacitor components 144 and 143 in its collector circuit, and the resistor component 146 in its emitter circuit. A third resistor means 147 is connected between bus 185 and the emitter electrode of transistor 150 and acts to bias transistor 150 into the cut-off state in a manner to be more fully described. The voltage level generated by transistor 150 is impressed upon the base electrode of transistor 155 which is connected to the collector electrode of transistor 150. A resistor 151 connects the collector electrode of transistor 155 to —12 volt D.C. bus 185, while resistance 148 connects emitter of transistor 155 to the B— bus 187. A movable contact 149 cooperates with the resistor 148 to form a potentiometer which impresses the voltage divided by this potentiometer through a resistor 152 to the control terminal of a linearly variable impedance means, to be more fully described.

The input signal S which is impressed upon the base electrode of transistor 110 is simultaneously therewith impressed upon the base electrode of transistor 160 by means of conductor 153. Transistor 160 is provided with emitter and collector resistances 157 and 156, respectively, connecting transistor 160 to the B— and —12 volt D.C. busses 187 and 185, respectively. A resistor 154 is connected between the base electrode of transistor 160 and the bus 185 which acts as a biasing means for transistor 160. The output signal generated in the emitter follower stage comprised of transistor 160 is connected through the capacitor 158 and the voltage divider circuit of resistors 162, 161 and 159 to the base electrode of transistor 165. A capacitor 163 is connected between the common terminal of resistors 161 and 162 and has its other terminal connected to the B— bus 187. Capacitors 158 and 163 have been provided to block the passage of D.C. levels therethrough.

Emitter follower stage 210 further comprises emitter and collector connected resistances 166 and 164 respectively, for connecting transistor 165 to the proper operating potentials. The emitter electrode of transistor 165 is connected through capacitor 167 to the base electrode of transistor 170 in the controlled voltage gain stage 211. The collector electrode of transistor 170 is connected through resistance 169 to bus 185, while the emitter electrode is connected through resistor 171 to the collector of a transistor 180. The emitter of transistor 180 is connected to one common terminal of the parallel connected resistor capacitor components 172 and 173, respectively, the opposite terminals of which are connected to the B— reference bus 187. The base electrode 181 of transistor 180 is connected to the output terminal 182 of emitter follower stage 208, described previously. Transistor 180 is provided for controlling the level of the output signal generated by emitter follower stage 210, which is further impressed upon the emitter follower output stage 212, in a manner to be more fully described. Resistors 168, 174 and 176 are employed for providing a D.C. bias on the base electrode of transistor 170.

The emitter follower stage 212 is comprised of a transistor 175, having its collector electrode connected to the negative voltage bus 185 via resistor 177 while its emitter electrode is connected through resistor 176 to the B— bus 187. The collector electrode of transistor 170 is connected to the base electrode of transistor 175 which connection is employed to control the conduction of transistor 175 in a manner to be more fully described. The signal generated by the emitter follower stage 210 is connected from the emitter electrode of transistor 165 through capacitor 167 and resistor 174 to the base electrode of transistor 170. The collector electrode of transistor 175 is connected to the negative D.C. bus 185 through resistor 177 while the emitter electrode is connected to the B— bus 187 by means of resistor 176. This emitter follower stage 212 provides a signal output at its terminal 190 for a tone receiver channel such as that shown in FIGURE 2 and to be more fully described hereinafter. Emitter follower 212 acts as an impedance matching means between the output of the control voltage gain stage 211 and the input of the tone receiver channel of FIGURE 2.

Figure 3:
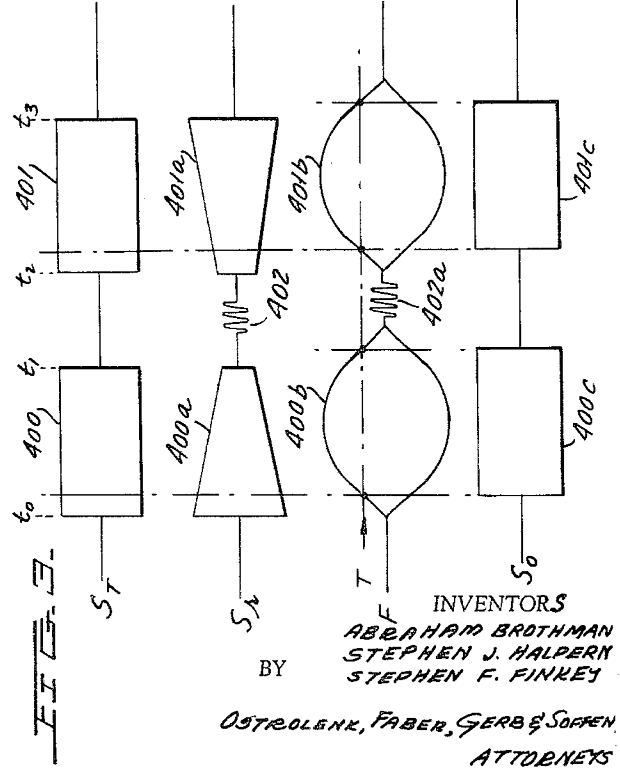
Figure 1B:
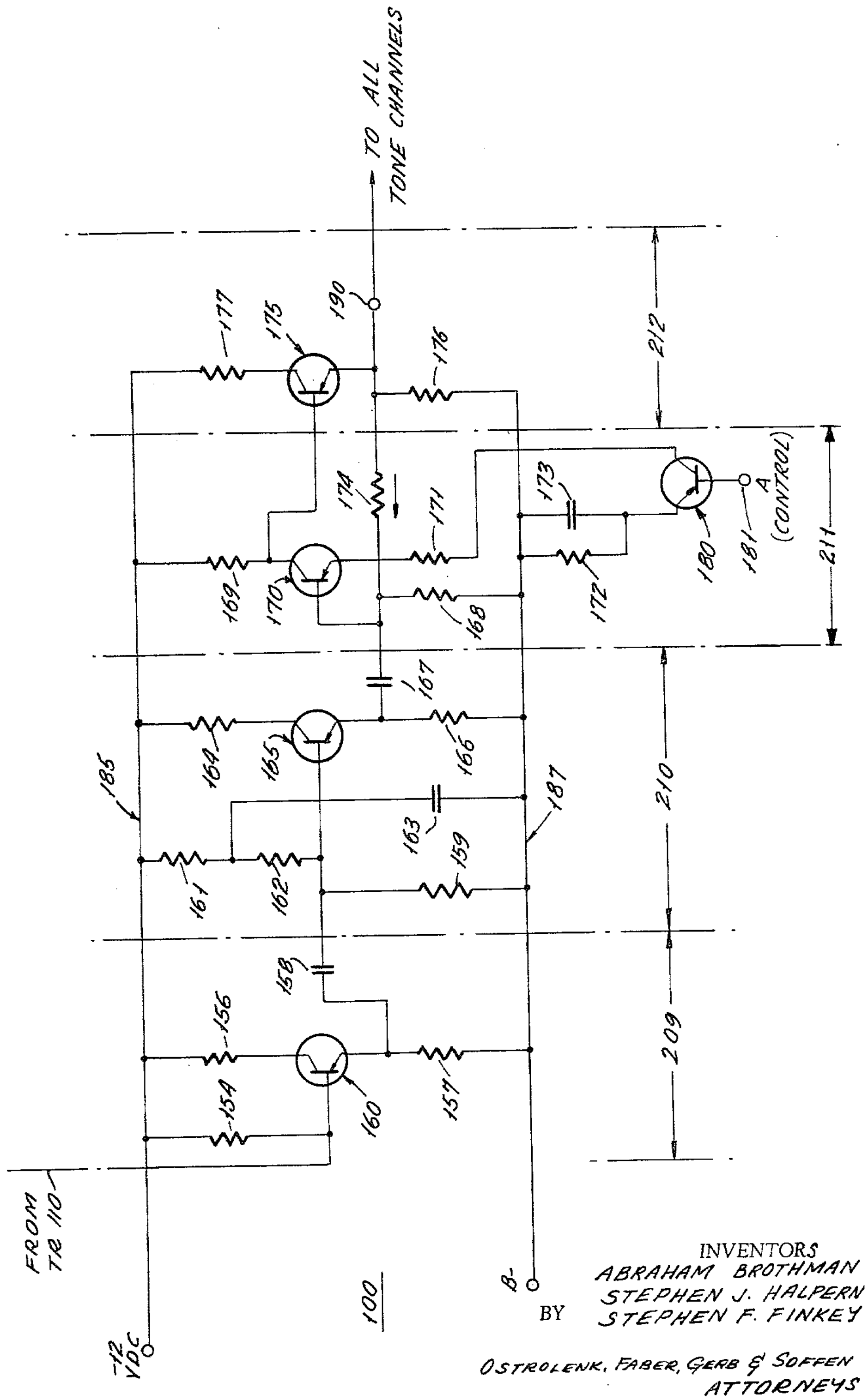

The operation of the self-adaptive terminal circuit 100 is as follows:

Referring to FIGURE 1 and further to the waveforms shown in FIGURE 3, the input signal S may be any modulated character signal received from a remote location by any receiving means such as, for example (antenna means), for the receipt of radio frequency waves, or wire means such as conductors employed in telegraphy or telephony communications systems. The input signal S is then impressed in any suitable manner upon the input terminals 102 and 103 of the self-adaptive terminal circuit 100. The embodiment shown in FIGURE 1 is adapted to adjust the levels of the amplified output signal which it produces for incoming signals which have undergone attenuation so that their levels may be in the desired range.

In addition to a rather constant attenuation the input intelligent signal experiences a voltage level drift and this is portrayed in FIGURE 3 wherein the waveform $S_t$ represents the transmitted information at the transmitted location before these signals are imposed upon the communications media, such as, for example, the telephone link. Block 400 occurring between time $t_0$ and $t_1$ represents a tarnsmitted message made up of plurality of binary coded characters. Block 401 represents a second wave envelope containing a second transmitted message occurring between the time $t_2$ and $t_3$. It should be understood that these wave envelopes 400 and 401 contain a plurality of binary one and binary zero level bits arranged in a predetermined manner so as to be a coded representation of the data being transmitted.

The waveform $S_r$ represents the information received at the receiver antenna (not shown) wherein wave envelope 400a represents the attenuation which the wave envelope 400 has undergone and in a like manner wave envelope 401a represents the attenuation experienced by the wave envelope 401. The substantially small wave envelope 402 occurring between time $t_1$ and $t_2$ represents noise injected into the link between message signals.

Waveform F represents the incoming message information after a filtering operation such as that performed by the demodulator circuit of the instant invention in order to "average" the message information received at the receiver location. Wave envelope 400b represents the change undergone by wave envelope 400a after filtering thereof and in the same manner wave envelope 401b represents the averaging experienced by wave envelope 401a after filtering thereof. The noise signal 402 injected into the communications link is filtered in a like manner.

As can be seen from FIGURE 3 it is necessary for the receiver facility to recognize the presence of a received message between the time intervals $t_0$ and $t_1$ for the message envelope 400 and between the time intervals $t_2$ and $t_3$ for the message envelope 401. Any noise information received outside of these time intervals are not of importance since they contain no useful information and only contain noise signals. Appropriate selection is performed by setting a threshold level T so that the message information will be suitably reproduced for decoding purposes during the interval from $t_0$ to $t_1$ for message envelope 400 and $t_2$ to $t_3$ for message envelope 401 and further, to eliminate any signal below these levels so as to generate a waveform $S_o$ which is substantially equal to the original message waveform $S_t$. The threshold level is therefore set so as to provide the aforementioned functions. The operation of the instant invention is as follows:

The incoming signal $S_R$ is first impressed upon emitter follower stage 201, which is provided for the purpose of effecting an impedance match between the incoming terminals 102–103 and the input of the voltage gain stage 202. Emitter follower 201 impresses the input signal 201′ upon the transformer 111 which provides further coupling between emitter follower stage 201 and the input of transistor 115 of voltage gain 202, which coupling is effected with a minimum amount of distortion.

The voltage gain stage 202 is designed to provide a gain adjustable to the lowest signal level permissible and generates an output 202′. Although the waveform 202′ is shown as being only slightly larger than the waveform 201′ it should be understood that the amplification undergone in gain stage 202 increases the amplitude level of the signal 202′ to a substantially greater degree than that shown. A true proportion of the signals has not been shown herein in order to preserve simplicity in the drawings. The output waveform 202′ is impressed upon the emitter follower stage 203 which in turn impresses the signal upon a second emitter follower stage 204. The purpose of emitter follower stage 204 is to provide, in addition to an impedance coupling function, adequate current gain for the purpose of feeding the input winding 129 of transformer 128.

The full wave rectifier action provided by the semiconductors 132 and 133, and the filtering action provided by the pi-network, comprised of capacitors 138 and 140, and the resistor 139 acts to substantially produce the waveform F shown in FIGURE 3 so that the output signal of the demodulator stage 205 is substantially as shown by the wave envelopes 400 and 401.

Assuming for a moment that no input signals have been impressed upon the terminal circuitry 100, it should be noted that the bias control biases the center tap terminal 131a of the secondary winding 131 to a negative level; for example, —3 volts D.C. In this condition, with the diodes 132 and 133 being forward biased, a voltage of approximately —2 volts D.C. appears at the output terminal of the demodulator stage 205, hence the input terminal (i.e., the base electrode of transistor 145) of emitter follower stage 206. In this condition, i.e., with no modulated carrier input signal, the base electrode of transistor 145 is thereby slightly biased into the full conductive state. The input signal impressed upon the input to the demodulator stage causes the level at the terminal 195 to go substantially more negative when the input signal $S_r$ has a large peak to peak value; that is, when it has not been attenuated to a large amount. On the other hand, if the input signal $S_r$ has been very substantially attenuated so that it may be down as much as —35 db (or lower dependent upon noise ambient of link) from the signal level at the remote transmission point (not shown), the voltage level at the terminal 195 undergoes very little change due to the signal impressed upon the demodulator stage 205.

The output of the demodulator stage 205 which is shown by the waveform F is impressed upon the input terminal of emitter follower stage 206, which in turn transfers the signal to the D.C. gain stage 207. Emitter follower stage 206 provides impedance matching between the output of the demodulator stage 205 and the input of the D.C. gain stage 207. Resistor 147 of D.C. gain stage 207 biases transistor 150 towards cut-off since it places a negative voltage level upon the emitter electrode thereof. The amplified signal 207′ upon the output of D.C. gain stage 207 is then impressed upon the emitter follower stage 208, which is provided to effect an impedance matching between the output of gain stage 207 and the input terminal 181 of the control voltage gain stage 211. Emitter follower stage 208 together with the potentiometer 148–149 provides the proper voltage range so as to operate transistor 180 within its linear operating range.

Simultaneously, with the impression of the waveform S upon the input terminal of emitter follower stage 201, the waveform $S_r$ is impressed by means of conductor 153 upon the input terminal of emitter follower stage 209. A second emitter follower stage 210 cascaded with emitter follower stage 209 and has its output terminal connected to the input terminal of control voltage gain stage 211. The emitter follower stages 209 and 210 provide impedance matching between the input terminals 102 and 103 of circuit 100, with the input terminals of the voltage gain stage 211.

The voltage gain stage 211, as previously described, is comprised of the series connected transistors 170 and 180, which are basically connected with the emitter electrode of transistor 180 effectively connected to reference potential, the collector electrode of transistor 180 connected to the emitter electrode of transistor 170, and the collector electrode of transistor 170 effectively connected through a resistor 169 to the negative voltage supply bus 185. This stage provides the necessary amplification to the incoming signals wherein the amount of amplification of the incoming signal is determined by the amount of attenuation which the input signal waveform S has undergone. For example, it can clearly be understood that if the amount of attenuation experienced by the input signal S has been small, the amount of gain necessary to raise the signal to a level suitable for use in the tone receiver channel of FIGURE 2 need not be a substantially larger amount, since the signal has undergone very little attenuation. On the other hand, if the signal has undergone a substantial amount of attenuation, the voltage gain level of the amplifier stage 211 must be substantially greater in order to provide a constant level for the output signal, which is again suitable for use in the tone receiver channel of FIGURE 2. This feature is provided by the transistor means 180, which is operated as a linear impedance means, the value of which is directly controlled by the voltage level of the D.C. signal, at the output terminal 182 of emitter follower stage 208. The transistor 180 is chosen such that its operating characteristics cooperate with the limit of voltage variations at output terminal 182 of emitter follower stage 208 so that the impedance characteristic is linear over the entire operating range, thus by controlling transistor means 180 in this manner, if a substantially small negative signal is impressed upon its input terminal (i.e., the base electrode 181), the transistor means 180 acts as a substantially high impedance element, providing diminished current flow through the series path of the transistors 170 and 180. This substantially diminishes the voltage gain level of the signal being amplified by the control voltage gain amplifier stage 211.

The amplified signal present at the emitter terminal of transistor 165 is impressed upon the base electrode of transistor 170 by means of capacitor 167. Capacitor 167 is also connected to the emitter electrode of transistor 175 by means of resistor 174. The value of resistor 174 is substantially large so that the output of emitter follower stage 210 is almost completely attenuated through the resistance member 174. With the appropriate linear resistance value inserted into the voltage gain stage 211 by means of the linear operating transistor 180, this amplified signal is then impressed upon the base electrode of transistor 175, the emitter electrode of which is at substantially the same voltage level as the base electrode such that resistor 174 acts as a feedback path coupling a portion of the voltage level at terminal 190 to the base electrode of transistor 170 so as to provide a dynamic bias means for the voltage gain stage wherein resistor 168 cooperates with resistor 174 to form a voltage divider circuit. The output terminal 190 of emitter follower stage 212 is then coupled to the threshold amplifier for operation in a manner to be more fully described.

In much the same manner, in order to amplify signals which have undergone a substantially large amount of attenuation, a more negative D.C. voltage is impressed upon the input terminal 181 of transistor means 180, thereby causing transistor means 180 to act as an element having substantially low effective impedance, enabling the voltage gain stage to generate more current, and therefore generate a signal having substantially more gain in order to maintain the wave envelope of the output signal constant relative to a predetermined threshold value, employed in the tone receiver channel and described previously herein.

Referring to the waveforms of FIGURE 3 it can be seen that at time $t_0$ the peak to peak value of the binary one signal being generated at this time is substantially greater than the peak to peak value of the wave envelope at the time $t_1$. Since the D.C. gain stage 207 described previously is biased into cut-off by the biasing resistor 147, it will be noted that a relatively small signal (i.e., one which has undergone a substantially large amount of attenuation due to noise or other reasons), is insufficient to bias transistor 150 into saturation, causing a voltage level of substantially −11 volts D.C., to be impressed upon the base electrode of transistor 155 and ultimately upon the input electrode 181 of transistor means 180, plus a substantially large negative voltage level, is impressed upon the transistor means 180, causing it to provide an effectively low impedance value in the voltage gain stage, thereby generating a substantial voltage gain therein. This is further brought out in the waveforms shown in FIGURE 3, wherein at the time $t_0$, when the peak to peak voltage of the input signal $S_r$ is substantially large, the D.C. voltage level present at the output of D.C. gain stage 207, and likewise at the output terminal 182 of emitter follower 208, is a substantially lower D.C. voltage. This voltage causes transistor means 180 to present an effectively high impedance value in the voltage gain stage 211, thereby substantially reducing the gain of that gain stage; or more appropriately, adjusting the gain of that gain stage, so as to provide a constant predetermined peak to peak voltage level for the amplified incoming signal.

At time $t_1$, wherein the peak to peak voltage of the incoming signal $S_r$ has deminished substantially, the output voltage level at terminal 182 at this time is a substantially larger negative voltage value, which controls transistor means 180 as a substantially small impedance in the voltage gain stage 211, thereby increasing the gain of that gain stage an amount sufficient to bring the output signal which undergoes this amplification to the predetermined peak to peak voltage desired.

Thus it can be seen that with respect to the binary one signal generated during the time period $T_1$, the control bias generated by the control stage comprised of the stages 201–208 respectively, acts in the manner described so as to maintain a constant peak to peak voltage level relative to a predetermined threshold value so as to produce the message envelope shown by the waveform $S_0$ substantially during the time period $t_0$–$t_2$, thereby producing a substantially square-shaped wave envelope.

Figure 4:
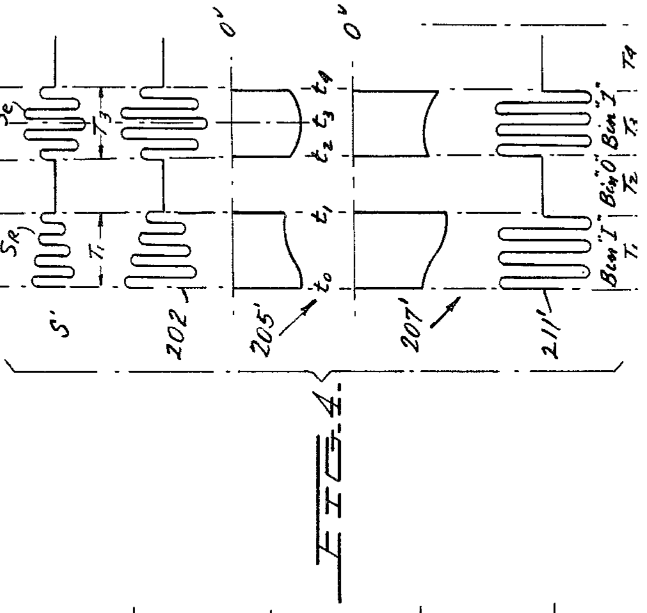
FIGURES 3 and 4 show a plurality of waveforms employed for describing the operation of the instant invention.

The waveforms shown in FIGURE 4 are similar to those shown in FIGURE 3 except that the actual waveforms as opposed to the envelope of the signals are portrayed therein. Referring to FIGURE 1 in conjunction with FIGURE 4 the incoming waveforms S′ can be seen to vary in amplitude. After amplification through amplifier stage 201 these waveforms appear as shown at 202. It should be understood that while amplification is many times the amplitude of the incoming signal, waveform 202 appears only slightly larger than waveform S′ so as not to complicate the drawings. The D.C. output of the demodulator proper 205 appears as substantially shown by the waveform 205′. The effective corrective action is represented by the waveform 207′ which represents an inversion of the D.C. output as provided by the D.C. gain stage 207 of FIGURE 1. This corrective action which actually is transformed into a resistance through use of transistor 180 which is operated as a linear resistor ultimately results in the waveform 211′ so as to restore substantially constant amplitude to the incoming signal S′.

The operation for reshaping the envelope 401 for the generator during the time period $t_2$–$t_3$ is identical to the operation described relative to the reshaping of the wave envelope 400.

Figure 2:
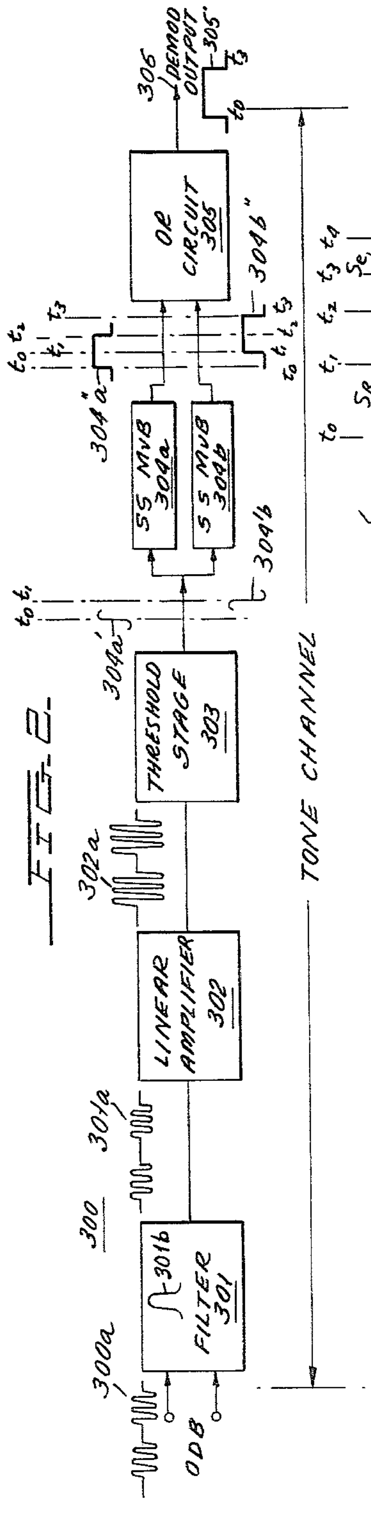
FIGURE 2 is a block diagram of a tone channel facility which may be employed with the circuitry of FIGURE 1 for receiving binary coded information signals.

FIGURE 2 shows a block diagram of a tone receiver channel of the type set forth in U.S. application No. 162,337 entitled "Tone Generator," filed December 27, 1961, by A. Brothman et al. and assigned to the assignee of the instant invention, U.S. application No. 238,952, "Credit Check System," filed November 20, 1962, by A. Brothman et al. and assigned to the assignee of the instant invention.

Since the tone receiver channel circuitry and operation is described in great detail in the application, Serial No. 238,952, a detailed description will not be given in this application, but reference to the tone receiver circuitry shown in FIGURES 7 and 8 of the application Serial No. 238,952, and the descriptive material setting forth the operation in this circuit, is incorporated herein by reference.

Basically, the tone receiver channel circuit 300 is comprised of a filter stage 301 which is of the band pass filter type, in which the frequency curve of $V_o$ divided by $V_i$ to frequency, is substantially in the form of the bell shaped curve 301*b*. This band pass filter stage 301 is therefore designed to pass signals within a narrow predetermined frequency range. Assuming that the frequency of the carrier waveform, such as for example, the carrier waveform S, shown in FIGURE 4, is the same frequency as that to which the band pass filter stage 301 is tuned, this signal frequency will therefore be passed by the filter stage 301 into the linear amplifier stage 302. The amplifier stage 302 amplifies the incoming signal to a suitable level and impresses the amplified signal upon a threshold stage 303. The threshold stage 303 functions as a gating means for the one-shot multivibrator circuits 304*a* and 304*b*, such that the one-shot multivibrators 304*a* and 304*b* are biased to a non-operating condition, which condition is continuously maintained until the input signals rise to a level sufficient to a trigger operation of the multivibrator circuits 304*a* and 304*b*. The one-shot multivibrator 304*a* is connected to the threshold stage 303 in such a manner that the positive going portion of the incoming signal shown by the portion of the waveform 304*a*′ acts to trigger operation of the multivibrator 304*a*. The multivibrator 304*b* is so connected to threshold stage 303 that the negative going portion 304*b*′ of the incoming signal 302*a* acts to trigger the multivibrator 304*b* during the negative going portions of the waveforms 302*a*.

Thus at the time $T_0$, referring to the waveform 304*a*′ the multivibrator 304*a* is triggered so as to generate a square pulse 304*a*″ having a front porch generated at time $T_0$, and a back porch generated at time $T_2$. The width of the square wave pulse 304*a*″ is substantially equal to 60% of a full cycle of the alternating waveform 302*a*, for a reason to be more fully described.

At time $T_1$, during the waveform 302*a* which occurs a half cycle behind time $T_0$, the negative going portion 304*b*′ acts to trigger the multivibrator 304*b* into operation so as to form a positive going pulse 304*b*″ having a front porch which is generated at time $T_1$ and a back porch or trailing edge which is generated at time $T_3$.

As can be seen from FIGURE 2, the leading edge of square pulse 403*b*″ occurs at a time prior to the trailing edge of square pulse 304*a*″, so that these two pulses overlap one another between the time $T_1$ to time $T_2$. These square pulses 304*a*″ and 304*b*″ are impressed upon the input terminals of OR circuit 305, which generates a single square pulse output 305′ having a leading edge which is generated at time $T_0$, and a trailing edge generated at time $T_3$. Thus it can be seen that the binary one input signals which take the form of a carrier 300*a*, having a substantially square-shaped wave envelope, acts to generate a square pulse 305′, having a pulse width which is substantially equal in time duration to the width of the binary one signal.

Figure 5:
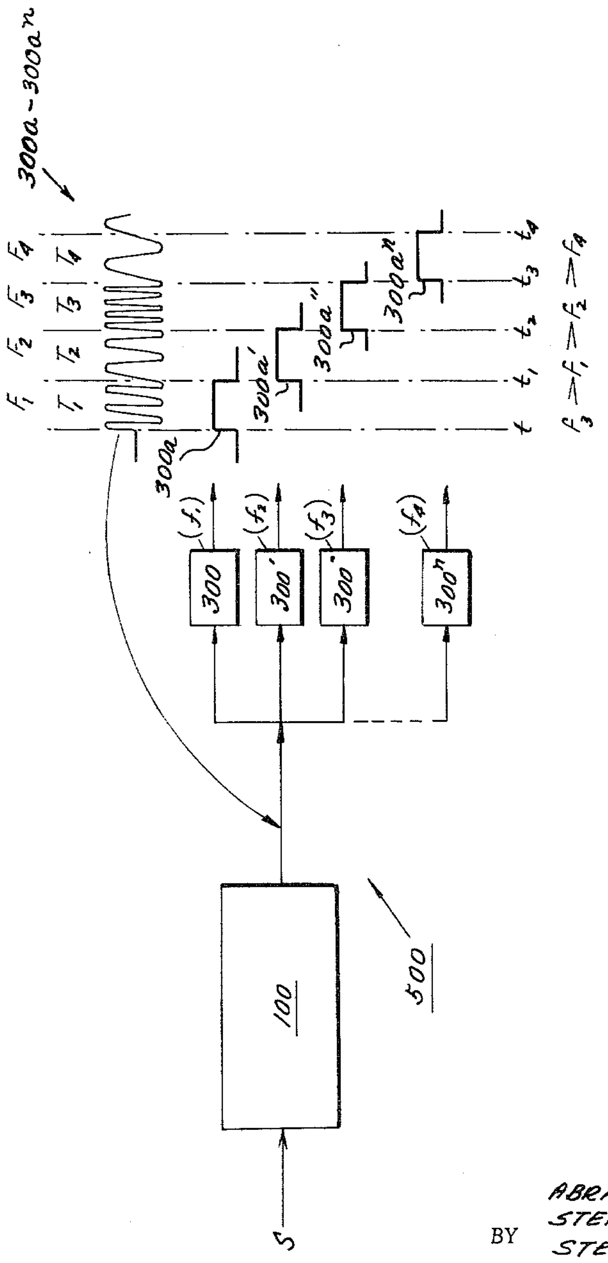

The self-adaptive terminal circuitry 100 of FIGURE 1 is constructed so as to feed a plurality of tone receiver channels of the type shown in FIGURE 2 in such a manner that a number of such tone receiver channels 300 may have their input terminals connected to the output terminal 190 of the self-adaptive terminal circuit 100 shown in FIGURE 1 whereby each tone receiver channel is provided with a different filter circuit which will pass only the frequency to which the band pass filter circuit is tuned, while the self-adaptive terminal circuit 100 will provide the necessary amplification for any signal frequencies which are impressed upon its input terminal. One example of such an arrangement is shown in FIGURE 5 in which a receiver system 500 is provided, having a self-adaptive terminal circuit 100 for receiving input signals having the waveform S shown in FIGURE 5. In this arrangement the self-adaptive terminal circuit 100 impresses the regulated output frequency signals upon the input terminals of a plurality of tone receiver channels 300, 300′ and 300″, . . . 300N, wherein each one of the tone receiver channels, 300–300N are each tuned to a different frequency. The incoming intelligence waveform is comprised of a plurality of different frequencies, each generated in a specific time period wherein a frequency $F_1$ is generated during time period $T_1$. A frequency $F_2$ is generated during time period $T_2$, etc. As shown in the waveform S of FIGURE 5, the frequencies portrayed therein are related to one another so that $F_3$ is greater than $F_1$, is greater than $F_2$, is greater than $F_4$.

Assuming that the tone channel receivers 300–300N are tuned to pass the frequencies $F_1$–$F_4$ respectively, then in the same manner as described in the operation of tone receiver channel 300 of FIGURE 2, the tone receiver channels 300–300N of FIGURE 5 generate the square pulses 300*a*–300*an* respectively. It can be seen that the square pulse 300*a* has its leading edge generated at time $T_0$ and its trailing edge generated at time $T_1$, which is during the time period that the frequency $F_1$ is generated. Likewise, it can be seen that the remaining square pulses are generated in the same identical manner.

Thus it can be seen that the instant invention provides a self-adaptive terminal circuitry which introduces sufficient gain for incoming intelligence signals so as to maintain their peak to peak voltage values constant and at a predetermined level relative to a selected threshold value. Thus the arrangement provides a means for amplifying the incoming signals to a level which better enables the determination of the binary characteristics of the incoming information so as to identify valid binary information which is being received. It can clearly be understood that the threshold voltage level of the threshold stage 300 may be chosen to be any desired value and the self-adaptive circuit 100 may then be adjusted to maintain the peak to peak voltage levels of the incoming signals at a level which is a constant ratio relative to the threshold voltage level. These adjustments may be readily made by means of the potentiometers 109, 119, 137 and 149, provided in the self-adaptive circuit 100 of FIGURE 1, so as to accommodate any voltage ratios desired by the user. As was further described, the circuit 100 may be employed for feeding a plurality of tone receiver channels wherein each one is tuned to receive a predetermined frequency band and to reject any signal frequencies which lie outside of this band.

It can therefore be seen that the instant invention provides circuitry for automatically adjusting the amplitude level of incoming signals so as to compensate for voltage drift in the received information signal levels without the need for performing additional calibrations upon the communications system equipment. Thus, for example, if climatic conditions change materially, or if the length or elements of the message loop are changed there is no necessity to recalibrate the equipment of the communications system since the self-adaptive terminal circuit will perform this function automatically. While it has been found that the circuit is quite effective in a range of 30 db the operating range may be increased or decreased depending only upon the needs of the user.

Although there has been described a preferred embodiment of this novel invention, many variations and modifications will now be apparent to those skilled in the art such as termination of a plurality of incoming links into a single receiver of the type described. Therefore, this invention is to be limited, not by the specific disclosures herein, but only by the appending claims.

The embodiments of the invention in which an exclusive privilege or property is claimed are defined as follows:

1. Electronic means for regulating the voltage level of a transmitted information signal whose quality has been affected by noise phenomenon comprising first means for receiving said information signal; second means connected to said first means for generating a control signal; third amplifying means for receiving and amplifying said information signal; said third means including series connected amplifying means and voltage controlled variable impedance means for linearly controlling the gain of said third amplifying means; said variable impedance means having a control terminal for receiving said control signal; said control signal being adapted to adjust the gain of said third means for maintaining the voltage level of the amplified information signal at a constant predetermined value.

2. Electronic means for regulating the voltage level of a transmitted information signal whose quality has been affected by noise phenomenon comprising first means for receiving said information signal; second means connected to said first means for generating a control signal; third amplifying means for receiving and amplifying said information signal; said third means including series connected amplifying means and voltage controlled variable impedance means for linearly controlling the gain of said third amplifying means; said variable impedance means having a control terminal for receiving said control signal; said control signal being adapted to adjust the gain of said third means for maintaining the voltage level of the amplified information signal at a constant predetermined value; said variable impedance means being a transistor.

3. Electronic means for regulating the voltage level of a transmitted information signal whose quality has been affected by noise phenomenon comprising first means for receiving said information signal; second means connected to said first means for generating a control signal; third amplifying means for receiving and amplifying said information signal; said third means including series connected amplifying means and voltage controlled variable impedance means for linearly controlling the gain of said third amplifying means; said variable impedance means having a control terminal for receiving said control signal; said control signal being adapted to adjust the gain of said third means for maintaining the voltage level of the amplified information signal at a constant predetermined value; said second means including fourth means for demodulating the incoming information signal to form said control signal.

4. Electronic means for regulating the voltage level of a transmitted information signal whose quality has been affected by noise phenomenon comprising first means for receiving said information signal; second means connected to said first means for generating a control signal; third amplifying means for receiving and amplifying said information signal; said third means including series connected amplifying means and voltage controlled variable impedance means for linearly controlling the gain of said third amplifying means; said variable impedance means having a control terminal for receiving said control signal; said control signal being adapted to adjust the gain of said third means for maintaining the voltage level of the amplified information signal at a constant predetermined value; said second means including fourth means for demodulating the incoming information signal to form said control signal; said demodulating means including a full wave rectifying means.

5. Electronic means for regulating the voltage level of a transmitted information signal whose quality has been affected by noise phenomenon comprising first means for receiving said information signal; second means connected to said first means for generating a control signal; third amplifying means for receiving and amplifying said information signal; said third means including series connected amplifying means and voltage controlled variable impedance means for linearly controlling the gain of said third amplifying means; said variable impedance means having a control terminal for receiving said control signal; said control signal being adapted to adjust the gain of said third means for maintaining the voltage level of the amplified information signal at a constant predetermined value; said second means including fourth means for demodulating the incoming information signal to form said control signal; said demodulating means including a full wave rectifying means; D.C. amplifier means connected to said full-wave rectifier means for generating a control voltage inversely related to the signal level output of said full-wave rectifier means.

6. Electronic means for regulating the voltage level of a transmitted information signal whose quality has been affected by noise phenomenon comprising first means for receiving said information signal; second means connected to said first means for generating a control signal; third amplifying means for receiving and amplifying said information signal; said third means including series connected amplifying means and voltage controlled variable impedance means for linearly controlling the gain of said third amplifying means; said variable impedance means having a control terminal for receiving said control signal; said control signal being adapted to adjust the gain of said third means for maintaining the voltage level of the amplified information signal at a constant predetermined value; said variable impedance means being a transistor; said transistor being adapted to provide varying impedance which is linear within the operating limits of said control voltage.

7. Electronic means for regulating the voltage level of a transmitted information signal whose quality has been affected by noise phenomenon comprising first means for receiving said information signal; second means connected to said first means for generating a control signal; third means for receiving and amplifying said information signal; said third amplifying means including series connected amplifying means and voltage controlled variable impedance means for linearly controlling the gain of said third amplifying means; said variable impedance means having a control terminal for receiving said control signal; said control signal being adapted to adjust the gain of said third means for maintaining the voltage level of the amplified information signal at a constant predetermined value; tone receiver means connected to said electronic regulating means for generating binary output pulses representative of the received information signal, said tone receiver means having gating means for rejecting information signals below a predetermined threshold value.

8. Electronic means for regulating the voltage level of a transmitted information signal whose quality has been affected by noise phenomenon comprising first means for receiving said information signal; second means connected to said first means for generating a control signal; third amplifying means for receiving and amplifying said information signal; said third means including series connected amplifying means and voltage controlled variable impedance means for linearly controlling the gain of said third amplifying means; said variable impedance means having a control terminal for receiving said control signal; said control signal being adapted to adjust the gain of said third means for maintaining the voltage level of the amplified information signal at a constant predetermined value; tone receiver means connected to said electronic regulating means for generating binary output pulses representative of the received information signal, said tone receiver means having gating means for rejecting information signals below a predetermined threshold value; said tone receiver means including fourth means for passing only a predetermined frequency band of signals upon said gating means.

9. Electronic means for regulating the voltage level of a transmitted information signal whose quality has been affected by noise phenomenon comprising first means for receiving said information signal; second means connected to said first means for generating a control signal; third amplifying means for receiving and amplifying said information signal; said third means including series connected amplifying means and voltage controlled variable impedance means for linearly controlling the gain of said third amplifying means; said variable impedance means having a control terminal for receiving said control signal; said control signal being adapted to adjust the gain of said third means for maintaining the voltage level of the amplified information signal at a constant predetermined value; tone receiver means connected to said electronic regulating means for generating binary output pulses representative of the received information signal; said tone receiver means having gating means for rejecting information signals below a predetermined threshold value; first and second multivibrator means connected to said gating means for generating square pulses when triggered by said gating means.

10. Electronic means for regulating the voltage level of a transmitted information signal whose quality has been affected by noise phenomenon comprising first means for receiving said information signal; second means connected to said first means for generating a control signal; third amplifying means for receiving and amplifying said information signal; said third means including series connected amplifying means and voltage controlled variable impedance means for linearly controlling the gain of said third amplifying means; said variable impedance means having a control terminal for receiving said control signal; said control signal being adapted to adjust the gain of said third means for maintaining the voltage level of the amplified information signal at a constant predetermined value; tone receiver means connected to said electronic regulating means for generating binary output pulses representative of the received information signal; said tone receiver means having gating means for rejecting information signals below a predetermined threshold value; first and second multivibrator means connected to said gating means for generating square pulses when triggered by said gating means; an OR circuit connected to said multivibrtor means for generating a single square pulse under control of said first and second multivibrator means, the width of said single square pulse being substantially the width of the portion of said information signal which exceeds said threshold value.

References Cited by the Examiner

UNITED STATES PATENTS

| | | | |
|---|---|---|---|
| 2,252,811 | 8/1941 | Lowell | 325—402 |
| 2,722,600 | 11/1955 | Forbes | 325—412 |
| 2,923,816 | 2/1960 | Schultz | 325—408 XR |
| 3,011,023 | 11/1961 | Billing | 178—88 |
| 3,093,802 | 6/1963 | Chow | 330—145 |
| 3,139,524 | 6/1964 | Louis | 330—144 XR |

ROBERT H. ROSE, *Primary Examiner.*

DAVID G. REDINBAUGH, *Examiner.*